Figure 1:
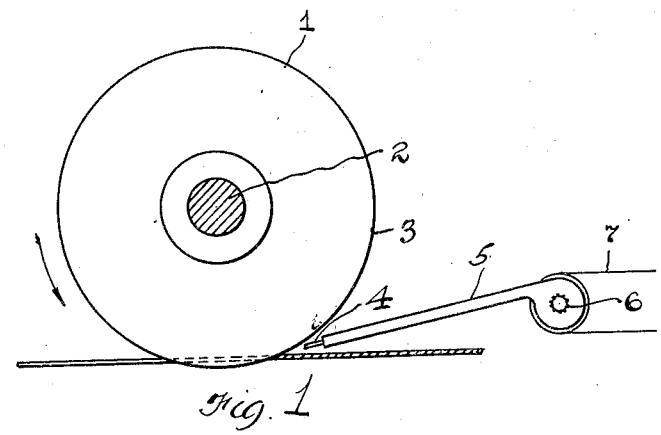

Nov. 15, 1927.

W. S. DIETRICH 1,648,938

METHOD AND APPARATUS FOR COOLING FRICTION SAWS

Filed Nov. 4, 1926

INVENTOR.

William S. Dietrich

BY

Fay, Oberlin & Fay

ATTORNEYS.

Patented Nov. 15, 1927.

1,648,938

UNITED STATES PATENT OFFICE.

WILLIAM S. DIETRICH, OF GREENVILLE, PENNSYLVANIA, ASSIGNOR TO THE GREENVILLE STEEL CAR COMPANY, OF GREENVILLE, PENNSYLVANIA, A CORPORATION OF PENNSYLVANIA.

METHOD AND APPARATUS FOR COOLING FRICTION SAWS.

Application filed November 4, 1926. Serial No. 146,188.

This invention as indicated relates to a method and apparatus for cooling high-speed friction saws. More particularly it comprises the method of dissipating some of the heat generated at the cutting edge of the saw through the projection of an air blast on the peripheral surface of the saw at a point intermediate of the eddy currents flowing over the outer margins thereof, together with the apparatus for effecting this purpose.

It is well known that friction saws having an extremely high peripheral speed act as blowers, drawing air in at the hub portion of the disc and discharging it over the circumferential edges thereof. The air thus forms a heavy film over the outer portion of the saw and the currents passing over the opposite side faces meet at a point spaced a short distance from the peripheral surface of the saw. It is impossible to break through this air layer at the sides of the saw and the only point at which one or more cooling jets of air may be effectively brought against the surface is at a point closely adjacent the surface, and preferably in alignment with the central plane of the saw.

It has heretofore been the practice to cool friction saws by means of jets of water, such jets being discharged against the saw blade and received in a well and thereafter returned to the pumping apparatus and again sprayed against the surface of the saw. A cooling expedient of this character is practical where a saw is used in an industrial plant mounted upon a traversing table with extremely rigid supporting means, but is wholly impractical where a saw is intended for use out of doors upon a traversing carriage and under all kinds of weather conditions. The use of water for cooling purposes under such circumstances would make the apparatus unduly cumbersome and would also result in the formation of ice about the working apparatus for controlling the saw as well as upon the articles operated upon. Under such special circumstances it is desirable to provide other means for cooling the saw in order to lengthen the life of the saw blade and provide for the most efficient operating conditions. I have found that this end may be accomplished by the method of injecting a stream of air against the peripheral surface of the saw at a point whereis the eddy currents flow over the lateral edges of the saw. Thus, at a point approximately one eighth of an inch from the surface of the saw, a nozzle may be positioned which will carry a stream of air into a zone of low pressure or slight rarefaction adjacent the edge of the saw which air stream will be carried through a large arc of the path of rotation of the saw.

To the accomplishment of the foregoing and related ends, said invention, then consists of the means hereinafter fully described and particularly pointed out in the claims.

The annexed drawing and the following description set forth in detail certain means and one mode of carrying out the invention, such disclosed means and mode constituting, however, but several of various ways in which the principle of the invention may be used.

Figure 2:
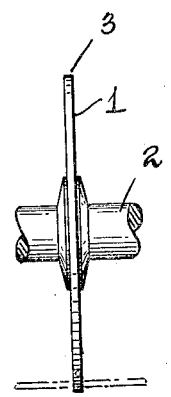
Figure 3:
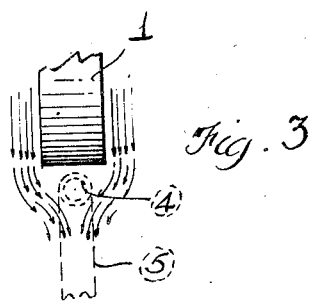

In said annexed drawing:

Fig. 1 is a diagrammatic view showing in side elevation a high speed friction saw and an air jet for supplying air to the peripheral surface thereof; Fig. 2 is an end elevation of the saw; and Fig. 3 is a fragmentary view, in enlarged detail, showing approximately the manner in which the air currents flow about the margins of a high speed friction saw blade.

As is shown in the drawing, a high speed friction saw 1 is mounted on an arbor 2, and is preferably rotated in a counter-clockwise direction. The saw is formed of the usual heavy disc of steel having a thickness varying with the use to which it is to be put, and having a smooth or a transversely notched edge according to the character of the work operated upon. The peripheral portion of the saw thus presents a substantially flat surface 3 and air currents are driven over the edges thereof through the centrifugal action of the saw blade moving at high speed. The air currents at the sides of the saw adjacent the marginal portions thereof are in the form of a heavy film or scum which adheres to the sides. The air layers on the opposite faces of the saw meet at a point spaced from the peripheral edge a distance slightly greater than one-eighth of an inch, when a saw of approximately one-half inch in thickness is used. Thus, there is a partial vacuum or rarefied area adjacent the peripheral surface of the saw which may be relieved by means of the current of cooling air projected against said surface at the point indicated. The air stream, as shown in the drawing, is projected from a nozzle carried in an air tube 5, mounted on an air supply pipe 7, and adjustable by means of a set screw 6.

One or more jets of air may be applied according to the degree of cooling which it is desired to effect upon the circumferential portion of the saw. The fact that a partial vacuum exists at the point indicated permits the cooling air to the rapidly carried along with the peripheral surface of the saw and thus projects the cooling effect of such air current over a large arc of travel of the saw, or until such air current becomes heated, and loses its effectiveness and is mingled with the eddy currents which have passed over the lateral faces of the saw.

The nozzle may be pointed toward the advancing edge of the saw, as shown in the drawing, or may be turned oppositely. When positioned as shown it is believed that the cooling air is projected more completely against the peripheral surface of the saw edge and enters more completely into the area of rarefaction beneath the meeting point of the eddy currents.

Other modes of applying the principle of my invention may be employed instead of the one explained, change being made as regards the means and steps herein disclosed, provided those stated by any of the following claims or their equivalent be employed.

I therefore particularly point out and distinctly claim as my invention:

1. A method of air cooling a high speed friction saw which includes the step of projecting a stream of cooling air within the meeting point of the air currents issuing over the lateral faces at the peripheral portion of the saw.

2. A method of air cooling a high speed friction saw which includes the step of projecting a stream of cooling air within the area of rarefaction adjacent the peripheral surface of the saw and extending the cooling effect of said air stream throughout a considerable arc of the travel of said saw through the confining action upon said air stream induced by said eddy currents.

3. An apparatus for cooling a friction saw which comprises a nozzle, means connecting said nozzle with a source of air supply, and means for positioning the end of said nozzle within the rarefied area adjacent the peripheral surface of the saw blade and closer to said surface than the meeting point of the eddy currents projected over the marginal surface of said saw.

Signed by me this 1st day of November, 1926.

WILLIAM S. DIETRICH.